Patented Nov. 27, 1934

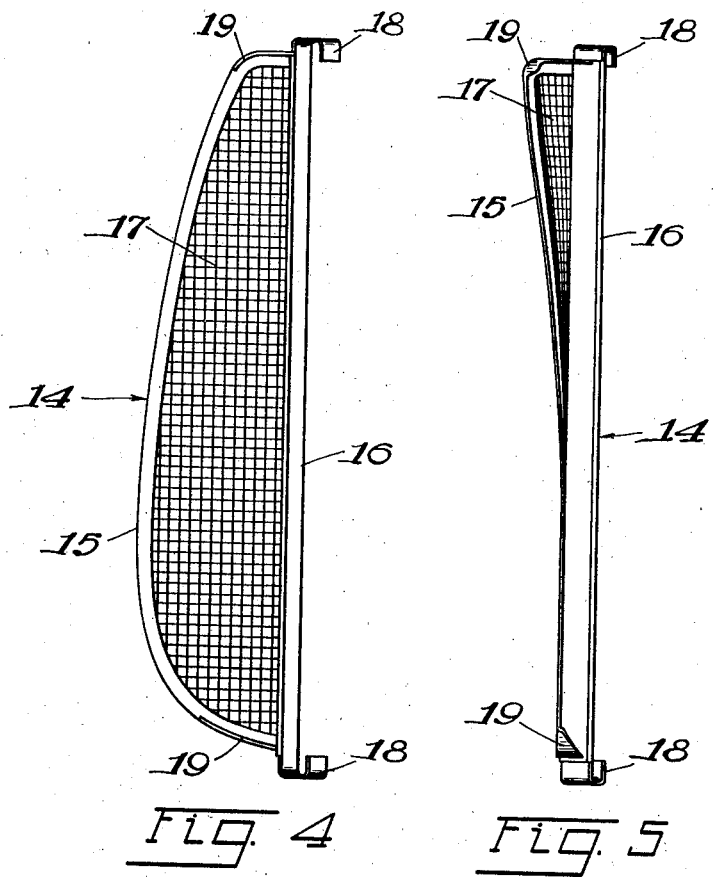
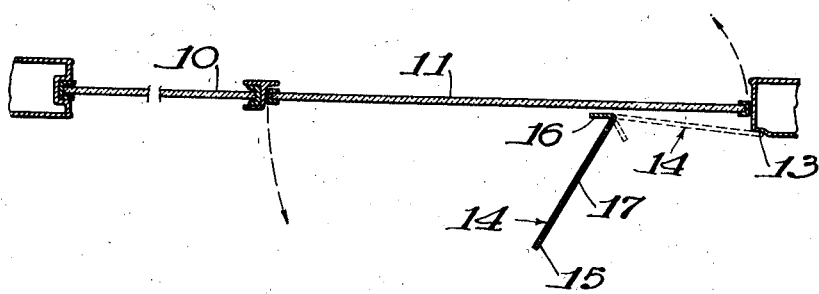

1,982,455

UNITED STATES PATENT OFFICE 1,982,455

CAR WINDOW SCREEN

Theodore T. Sansbury, Parkersburg, W. Va.

Application February 21, 1934, Serial No. 712,274

5 Claims. (Cl. 156—14)

My invention relates to screened ventilators for automobile windows or windows on movable vehicles wherein provision is made for bringing a part or all of the glass of the window to an angled position. In such windows, the angled position of the glass is used for the purpose of intercepting a stream of air and deflecting it into the automobile or vehicle for ventilating the interior thereof. Without my improvement applied to the glass of the window, the intercepted flow of air is apt to carry with it into the car various types of foreign matter such as insects, bees and the like. The presence of these, within the car, constitutes a real hazard to life for the occupants of the car. Furthermore, my invention helps to effect an even distribution of the air currents deflected into the car by the window.

The object of my invention therefore is to overcome these defects by filtering out of the incoming stream of air such foreign matter and at the same time effect a more even distribution of the air currents which are deflected into the moving vehicle.

Figure 3 represents a horizontal section along the line II—II of Figure 1 showing in particular, the approximate angular position of the interceptor or screen. The dotted lines show the interceptor in one operative position.

Figure 4 represents an elevational view of the interceptor.

Figure 5 represents an elevational view of the edge of the interceptor showing, in particular, the curvature of the upper part of said interceptor.

Figure 1:
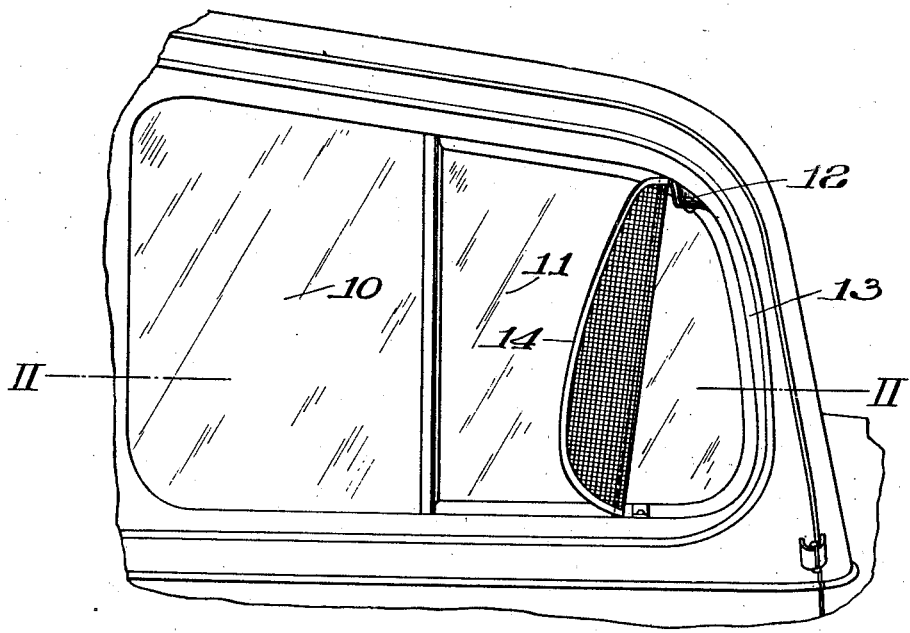
Figure 1 represents a side elevational view of an automobile front door with closed windows showing the screen or interceptor attached to the window.
Figure 2:
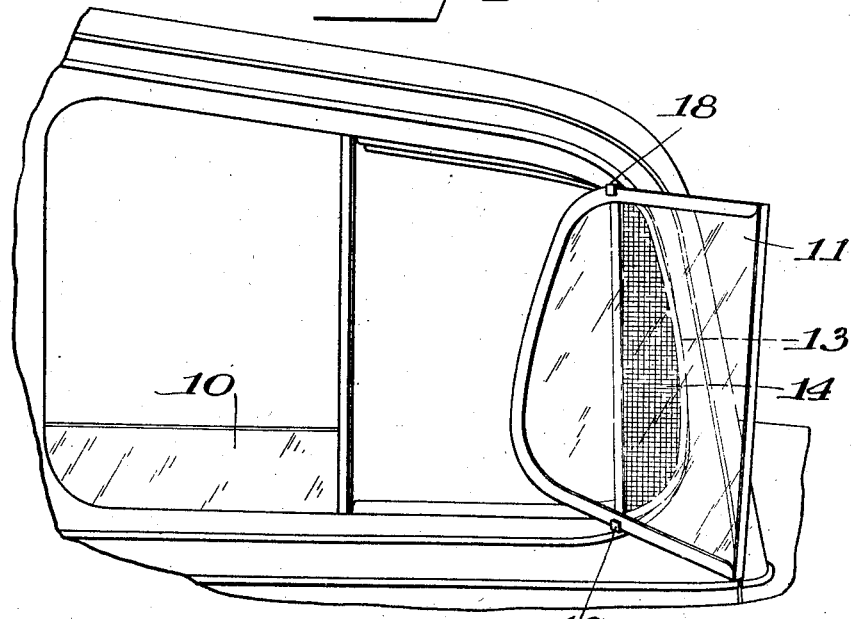
Figure 2 represents a side elevational view of the automobile front door, showing a part of the window glass in an angled position for deflecting air into the car. The interceptor is shown in one operative position.

The glass in the window of some automobiles is made in two parts as illustrated by 10 and 11 of Figure 1. The glass 11 is pivoted as shown at 12 so that it can be turned, by any suitable means, to an angular position as shown in Figure 2. Another pivot means, not shown, is provided on the bottom part of the window in line with pivot 12. In such windows, the angled position of the glass is used for the purpose of intercepting a stream of air and deflecting it into the car or vehicle between the door frame 13 and glass 11. I have found that a perforated interceptor 14 may be attached to the glass window 11 so that said interceptor will be automatically moved into position when the glass 11 is turned to the ventilating position. The perforated interceptor fills the opening between the door frame 13 and glass 11. Figure 1 shows the window glass in a non-ventilating position with the interceptor attached thereto. With the glass in this position the interceptor extends out from the line of the car at an angle of about 50 to 60°; however, this angle may be increased or decreased somewhat to conform with the particular type of window on which it is employed.

The interceptor, see Figures 4 and 5, is made of a thin sheet metal or hard rubber frame as shown at 15, shaped to fill the opening formed by the angled position of the glass window 11 on one side and the rail 13 of the door on the other. The frame of the interceptor is filled with a metallic or fabric screen 17, about 6 to 8 mesh per square inch. The base member 16 of the interceptor may be made of a somewhat heavier piece of metal or hard rubber. The interceptor is preferably fastened to the rim of the window 11 as shown in Figures 2, 4 and 5 by the U-shaped clamp 18 on each end of the frame. When the interceptor is fastened to the window, as shown in Figure 3, the base member 16 is almost flush with the plate glass. However, if desired, the base member 16 may rest against the window. The frame 15 is not perpendicular to the base member 16 but is at an angle of about 50 to 60°. This relation of members is clearly shown by Figure 3. It is apparent, however, that this angle may be varied to meet the particular design of the vehicle to which the interceptor is attached.

If desired, the interceptor may be reinforced with braces as shown at 19 on Figures 4 and 5. Also the top part or narrow portion of the frame 15 may be flexed slightly as shown in Figure 5 so that it will conform with the opening between the door frame 13 and glass 11 when the glass is swung to the ventilating position. The interceptor may be made in different sizes in order to fill the space between the surface of the glass and the rail of the door when said glass is swung out through an angle greater than 90° from its closed position.

While I have described my invention with reference to a specific embodiment thereof, it should be understood that the scope of my invention is not limited thereby except as defined by the claims appended hereto.

I claim:

1. The combination of a vertical glass window in the door of a vehicle, a section of which is capable of taking a position to deflect air into said vehicle, an interceptor attached to said window and projecting therefrom, said interceptor adapted to fill the space between the frame of said door and the window when said window is moved into an operative position.

2. In combination, an automobile window glass pivotally mounted in a door of an automobile, said window being capable of being moved into a position to deflect air into the automobile between its outer edge and the front rail of the door, and a screen rigidly mounted on said window and positioned to fill the space between the window and the rail of the door when said window is swung outwardly into a deflecting position.

3. In combination, a vertical glass window pivotally mounted in the door of an automobile, a deflector secured to the periphery of said window and positioned to fill the space between the outer surface of the window and the rail of said door when said window is swung out through an angle greater than 90° from its closed position.

4. A screen adapted to be mounted on a window mounted for pivotal movement about an axis and projecting from the surface of said window, comprising in combination a base member for disposition transversely across the window, means associated with each end of said base member for detachable engagement with adjacent portions of the window, and a screen carried by said base member and extending away therefrom.

5. In combination, an automobile window glass provided with a frame about the periphery thereof and pivotally mounted in a door of an automobile, said window glass being capable of being moved into a position to deflect air into the automobile between its outer edge and the front rail of the door, and a screen rigidly mounted on the frame of said window glass and positioned to fill the space between the window glass and the rail of the door when said window glass is swung outwardly into a deflecting position.

THEODORE T. SANSBURY.